(12) United States Patent
Koshiishi et al.

(10) Patent No.: US 8,816,250 B2
(45) Date of Patent: Aug. 26, 2014

(54) PULSED ARC WELDING METHOD

(75) Inventors: Fusaki Koshiishi, Fujisawa (JP); Keiichi Suzuki, Fujisawa (JP); Kei Yamazaki, Fujisawa (JP); Masahiro Honma, Fujisawa (JP)

(73) Assignee: Kobe Steel, Ltd., Kobe-shi (JP)

( * ) Notice: Subject to any disclaimer, the term of this patent is extended or adjusted under 35 U.S.C. 154(b) by 1722 days.

(21) Appl. No.: 11/670,648

(22) Filed: Feb. 2, 2007

(65) Prior Publication Data

US 2007/0210048 A1 Sep. 13, 2007

(30) Foreign Application Priority Data

Mar. 10, 2006 (JP) .................. 2006-065650

(51) Int. Cl.
*B23K 9/10* (2006.01)
*B23K 9/173* (2006.01)
*B23K 9/095* (2006.01)
*B23K 9/09* (2006.01)

(52) U.S. Cl.
CPC ............... *B23K 9/092* (2013.01); *B23K 9/173* (2013.01); *B23K 9/095* (2013.01)
USPC .............. 219/130.51; 219/130.1; 219/130.5

(58) Field of Classification Search
USPC ............... 219/130.1, 130.51, 130.21, 130.33, 219/130.31
See application file for complete search history.

(56) References Cited

U.S. PATENT DOCUMENTS

| | | | | |
|---|---|---|---|---|
| RE33,330 E | * | 9/1990 | Ogasawara et al. | ..... 219/137 PS |
| 5,495,091 A | * | 2/1996 | Tabata et al. | ............. 219/130.51 |
| 5,525,778 A | * | 6/1996 | Matsui et al. | ............ 219/130.51 |
| 5,990,445 A | | 11/1999 | Ogasawara et al. | |
| 6,051,807 A | | 4/2000 | Ogasawara et al. | |

FOREIGN PATENT DOCUMENTS

| | | |
|---|---|---|
| JP | S53-062755 | 6/1978 |
| JP | 7-290241 | 11/1995 |
| JP | 7-47473 | 2/1996 |
| JP | 8-229680 | 9/1996 |
| JP | 8-267238 | 10/1996 |
| JP | H08-318375 | 12/1996 |
| JP | 10-263815 | 10/1998 |
| JP | H10-263815 | 10/1998 |
| JP | 2000-317677 | 11/2000 |

(Continued)

OTHER PUBLICATIONS

U.S. Appl. No. 11/470,949, filed Sep. 7, 2006, Koshiishi, et al.

(Continued)

*Primary Examiner* — Henry Yuen
*Assistant Examiner* — Ayub Maye
(74) *Attorney, Agent, or Firm* — Oblon, Spivak, McClelland, Maier & Neustadt, L.L.P.

(57) ABSTRACT

A pulsed arc welding method using carbon dioxide gas alone or a mixed gas made mainly of carbon dioxide gas as a shield gas, provides a pulse current of alternately repeating first and second pulses as a weld current. The first pulse and the second pulse have a pulse waveform of a different pulse peak current level and a different pulse width, respectively, and the following conditions are satisfied: peak current of the first pulse ($I_p1$)=300 to 700 A; peak period ($T_p1$)=0.3 to 5.0 ms; base current $I_b1$=30 to 200 A, base period ($T_b1$)=0.3 to 10 ms; peak current of the second pulse ($I_p2$)=200 to 600 A; peak period ($T_p2$)=1.0 to 15 ms; base current ($I_b2$)=30 to 200 A; and base period ($T_b2$)=3.0 to 20 ms.

7 Claims, 3 Drawing Sheets

(56) References Cited

FOREIGN PATENT DOCUMENTS

| JP | 2001-129668 | 5/2001 | | |
| JP | 2001-129684 | 5/2001 | | |
| JP | 2003-230958 | 8/2003 | | |
| JP | 2003-236668 | 8/2003 | | |
| JP | 2003236668 A | * 8/2003 | ............. | B23K 9/173 |

JP   2003-290924   10/2003

OTHER PUBLICATIONS

U.S. Appl. No. 12/364,739, filed Feb. 3, 2009, Yamazaki, et al.
Office Action issued Sep. 21, 2011 in Japanese Patent Application No. 2006-065650 filed Mar. 10, 2006 (in English).

* cited by examiner

PULSED ARC WELDING METHOD

BACKGROUND OF THE INVENTION

1. Field of the Invention

The present invention relates to a pulsed arc welding method using, as a shield gas, carbon dioxide gas alone or a mixed gas containing a carbon dioxide gas as a main component, more particularly, to a pulsed arc welding method in which droplet transfer is realized in synchronism with a group of pulses to thereby stabilize a welding arc and, at the same time, to significantly reduce spatter and fume generation rates.

2. Description of the Related Art

The MAG welding method using, as a shield gas, a mixed gas of Ar and 5 to 30% of $CO_2$ is able to reduce spatter and fume generation rates through the fine droplets, for which the method has been applied to a wide variety of fields in the past. Especially, in the field where high quality welding is required, the pulse MAG welding method wherein one pulse-one droplet transfer is performed by outputting a welding current of about 100 to 350 Hz as a pulse current has now been in wide applications.

However, since Ar gas is costly, compared with carbon dioxide gas, carbon dioxide gas alone or a mixed gas made mainly of carbon dioxide gas has been predominantly used as a shield gas for carrying out welding operations in general.

On the other hand, in the case that carbon dioxide gas alone or a mixed gas made mainly of carbon dioxide gas is used as a shield gas, the resulting droplet is rendered coarse in size to an extent of about 10 times larger over the case of the MAG welding method and is irregularly vibrated and deformed by the action of the arc force. This undesirably leads to the problems in that short-circuiting with a base metal and arc break are liable to occur, droplet transfer becomes irregular, and spatters and fumes are excessively generated.

To cope with such problems, Japanese Patent Laid-Open Nos. Hei 7-290241 and Hei 7-47473 propose a method for realizing a one pulse-one droplet transfer even in the carbon dioxide gas arc welding by applying pulse welding to carbon dioxide gas shield arc welding and by defining pulse parameters and welding wire components. According to this technique in the art, a droplet of a satisfactory size is formed at a wire tip prior to application of a peak current so that an electromagnetic pinch force of the peak current may cause the droplet to be constricted at an early stage, thereby permitting the droplet to be released from the wire before the droplet is forced back toward the wire direction by the arc force.

In regard to the above welding method, Japanese Patent Laid-Open No. Hei 8-267238 has proposed a welding method wherein external output-characteristics change control is performed for controlling output of power source for welding, thereby achieving a further reduction of spatter.

Moreover, Japanese Patent Laid-Open Nos. 2003-236668 and 2001-129668 relate to an arc welding method using a shield gas made mainly of carbon dioxide gas, wherein it is stated that generation of seven or more pulses within one droplet transfer time contributes to reducing spatters and weld fumes.

Further, Japanese Laid-Open Patent Application No. Hei 8-229680 relates to an output control device of a pulse arc welding machine using a shield gas made mainly of carbon dioxide gas, wherein it is stated that the release of a droplet is detected by an increase of voltage or resistance and the current of a lower level is outputted for a predetermined period of time from the detection time, to thereby suppress the generation of spatters.

In addition, Japanese Laid-Open Patent Application No. Hei 10-263815 states that the generation of spatters can be suppressed by utilizing a pulse arc welding machine which outputs two different pulse waveforms using a shield gas made mainly of carbon dioxide gas, wherein the pulse waveforms comprise a first pulse setting a pulse period and a base period short according to an increase in the wire feed quantity and a second pulse with a pulse period shorter than the first pulse.

The conventional welding methods described in the above Japanese Patent Laid-Open Nos. Hei 7-290241, Hei 7-47473, and Hei 8-267238 make use of inexpensive carbon dioxide gas as a shield gas, enable one pulse-one droplet transfer and improve regularity of the droplet transfer. At the same time, a large-particle spatter generation rate can be reduced over pulse-free welding. In these conventional methods, however, there is a problem that the droplet is released during the pulse peak period, causing particulate spatters to be generated in large amounts due to scattering in the constricted portion of the wire tip when the droplet is released and due to scattering of a molten pool remaining on the wire after the droplet is released therefrom.

In the methods disclosed in Japanese Patent Laid-Open Nos. 2003-236668 and 2001-129668, it is stated that when seven or more pulses are oscillated within one droplet transfer time, droplets can be made small in size. Nevertheless, as long as a gas made mainly of carbon dioxide gas is used as a shield gas, the size of a droplet is at least 10 times the size of a droplet in the MAG pulse welding, with the particulation effect being not so significant. The droplet transfer is complicatedly interrelated with the size of a droplet, the electromagnetic pinch force in a peak period, an upward force resulting from an arc force, convection and vibrations inside the droplet ascribed to these factors, and the like. The release timing is determined through the balance of a force acting along a release direction of the droplet. Therefore, a significant reduction of spatters cannot be attained by simply applying high frequency pulses continuously as in these conventional methods because the release time differs in every release timing, and the intervals of the droplet transfer vary within a range of about 15 to 25 milliseconds.

Moreover, in the above methods, since a high frequency pulse is applied simply to ensure smooth droplet transfer and thus, a peak current, base current and pulse width are, respectively, fixed, a frequency has to be modulated for the purpose of controlling an arc length at a given level in the case where the distance between a chip and a base metal is varied. That is, in order to control a wire melting rate, a pulse frequency has to be greatly changed, but this only disturbs regularity of droplet transfer. Accordingly, in the case of weaving a groove where the distance between a chip and a base metal varies within about ±5 mm from a standard condition, a difficulty is involved in keeping a stable arc.

Although Japanese Laid-Open Patent Application No. Hei 8-229680 teaches that the output control device is capable of suppressing the generation of spatters by detecting the release of a droplet and lowering the amount of current for a given period, it is based on an assumption that a pulse peak current is constant for every pulse regardless of whether or not a droplet has been released. If a pulse peak current permitting the release of a droplet is set, a molten metal remaining on a wire after the release of a droplet scatters by a great arc force when a subsequent pulse peak after the release is applied and generates a lot of large-particle spatters. Lowering the pulse peak current to suppress this only causes the droplet not to be released during the pulse peak period.

Further, as described above, according to Japanese Laid-Open Patent Application No. Hei 10-263815, the generation of spatters can be suppressed by a pulse arc welding method outputting two different pulse waveforms, wherein the pulse waveforms comprise a first pulse setting a pulse period and a base period short according to an increase in the wire feed quantity and a second pulse with a pulse period shorter than the first pulse. However, when a first pulse period and a first base period are set short according to an increase in the wire feed quantity, in a cutoff layer under an electromagnetic pinch force by the second pulse, a droplet at a wire tip is not shaped in a satisfactory manner and the electromagnetic pinch force is not effectively applied. In consequence, regularity of one pulse group-one droplet transfer cannot be kept, and large-particle spatters are generated.

SUMMARY OF THE INVENTION

Therefore, an object of the invention is to provide a pulsed arc welding method, wherein a very high regularity of one pulse-one droplet transfer is kept even when a shield gas is made mainly of carbon dioxide, so that large-particle spatters and fume generation rates can be reduced and at the same time particulate spatters due to scattering in a constricted portion at the wire tip during the release of a droplet and scattering of a remaining molten pool on a wire after the release of a droplet can be significantly reduced.

In the method of the present invention, there is provided a pulsed arc welding method using carbon dioxide gas alone or a mixed gas made mainly of carbon dioxide gas as a shield gas and using a pulse current of alternately repeating first and second pulses as a weld current, wherein the first pulse and the second pulse have a pulse waveform of a different pulse peak current level and a different pulse width, respectively, and the following conditions are satisfied: peak current ($I_p1$) of the first pulse=300 to 700 A; peak period ($T_p1$)=0.3 to 5.0 ms; base current $I_b1$=30 to 200 A, base period ($T_b1$)=0.3 to 10 ms; peak current ($I_p2$) of the second pulse=200 to 600 A; peak period ($T_p2$)=1.0 to 15 ms; base current ($I_b2$)=30 to 200 A; and base period ($T_b2$)=3.0 to 20 ms. In addition, provided that $I_p1 > I_p2$, one pulse-one droplet transfer is kept, and a distance between a contact chip and a base metal is varied, at least one of the parameters selected from a group consisting of $I_p2$, $I_b2$, $T_p2$, and $T_b2$ is adjusted so as to control an arc length at a given level, within a range that one pulse-one droplet transfer is not violated.

In the present invention, two different pulse waveforms of a different pulse peak current level and a different pulse width per pulse are alternately continuously oscillated, to transfer one droplet per pulse. In this manner, regularity of droplet transfer is improved and the generation of large-particle spatters is reduced. Besides, by lowering current to a base current in synchronism with droplet release timing, the generation of particulate spatters due to scattering in a constricted portion at a wire tip during the release of a droplet and due to scattering of a molten pool remaining on a wire after a droplet has been released can be significantly reduced. In particular, in the present invention, a first pulse peak current and a second pulse peak current are set properly according to their roles, so that a molten metal remaining on the wire after the release of a droplet may be prohibited from separating/scattering at the time of application of the second pulse peak to disturb the regularity of droplet transfer and the generation of large-particle spatters in large amounts can be prevented.

In this case, when the distance between a contact chip and a base metal varies, an arc length can be readily kept at a given level by adjusting at least one parameter selected from a group consisting of $I_p2$, $I_b2$, $T_p2$, and $T_b2$. Accordingly, even though the distance between a chip and a base metal varies, feeding back variations in voltage and current, within ranges not disturbing one pulse-one droplet transfer, at least one or more than two of $I_p2$, $I_b2$, $T_p2$, and $T_b2$ can be properly adjusted. As such, an arc length can be kept at a given level by controlling a wire melting rate.

Further, in the present invention, preferably, proper $I_p2$, $T_p2$, and $I_b2$ are preset by wire feed rates, and at least one parameter selected from a group consisting of $I_p2$, $T_p2$, and $I_b2$ is increased to ensure $T_b2$ to fall within a range of 3.0 to 20 ms with an increase in the wire feed rate, to thereby increase the wire melting rate. Moreover, in order to make a smooth variation with respect to a rise and fall of the first pulse, a slope is formed about a time axis. Likewise, a slope is formed about a time axis in order to make a smooth variation with respect to a rise of the second pulse. Suppose that an upward slope period of the first pulse is $T_{up}1$, a downward slope period of the first pulse is $T_{down}$, and an upward slope period of the second pulse is $T_{up}2$. Then, both $T_{up}1$ and $T_{up}2$ are preferably not longer than 3 ms, and $T_{down}$ is preferably not longer than 6 ms.

In addition, it is preferable to detect the release of a droplet during the first pulse peak period ($T_p1$) or during the subsequent first pulse downward slope period ($T_{down}$) and, at the same time, it is preferable to change a welding current to a predetermined current lower than the first pulse base current ($I_b1$) or lower than the current during detecting.

A high frequency pulse of a pulse frequency in a range of 500 to 2000 Hz is preferably superposed on the welding current in one of the periods or in at least two periods among ($T_{up}1$, $T_p1$, $T_{down}$, and $T_b$), or ($T_{up}2$, $T_p2$, and $T_b2$), In the present invention, a consumable electrode wire is preferably made of not more than 0.1 wt % of C, 0.20 to 1.0 wt % of Si, 0.5 to 2.0 wt % of Mn, and 0.05 to 0.40 wt %, in total, of Ti+Al+Zr with the balance being Fe and inevitable impurities.

Further, the consumable electrode wire is preferably not plated with copper on the wire surfaces.

In the arc welding of a consumable electrode type according to the invention wherein carbon dioxide gas alone or a mixed gas made mainly of carbon dioxide gas is used, one pulse-one droplet transfer can be achieved in a very highly regular manner. On comparison with prior art methods, stabilization of a welding arc is improved, large-particle spatters and fume generation rates can be remarkably reduced and, at the same time, particulate spatters due to scattering in a constricted portion at the wire tip during the release of a droplet and due to scattering of a remaining molten pool on a wire after the release of a droplet can be significantly reduced. If the distance between a chip and a base metal varies, an arc length can be readily kept at a given level by controlling pulse parameters, within ranges not disturbing the one pulse-one droplet transfer.

Further objects, features and advantages of the present invention will become apparent from the following description of the preferred embodiments with reference to the attached drawing.

BRIEF DESCRIPTION OF THE DRAWINGS

Embodiments of the present invention will be described in detail based on the following figures, wherein.

DESCRIPTION OF THE PREFERRED EMBODIMENTS

Figure 1:
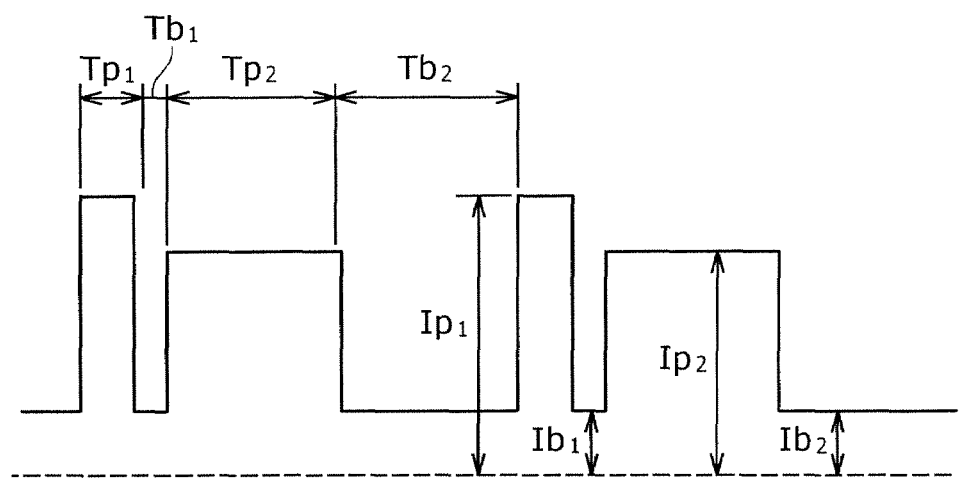
FIG. 1 is a waveform diagram showing a pulse current used in a pulsed arc welding method of the present invention.

A preferred embodiment of the present invention will now be described in detail with reference to accompanying drawings. FIG. 1 is a waveform diagram showing a pulse current used in a pulsed arc welding method of the present invention. In the pulse current, a first pulse and a second pulse are alternately repeated. In the first pulse, $I_p1$ denotes a first pulse peak current, $T_p1$ denotes its period (a first pulse peak period), $I_b1$ denotes a first pulse base current, and $T_b1$ denotes its period (a first pulse base period). In the second pulse, $I_p2$ denotes a second pulse peak current, $T_p2$ denotes its period (a second pulse peak period), $I_b2$ denotes a second pulse base current, and $T_b2$ denotes its period (a second pulse base period).

In the first embodiment of the present invention, pulse conditions are set as follows:
(a) peak current $I_p1$ of first pulse=300-700 A;
(b) peak period $T_p1$ of first pulse=0.3-5.0 ms;
(c) base current $I_b1$ of the first pulse=30-200 A;
(d) base period $T_b1$ of first pulse=0.3-10 ms;
(e) peak current $I_p2$ of second pulse=200-600 A;
(f) peak period $T_p2$ of second pulse=1.0-15 ms;
(g) base current $I_b2$ of the second pulse=30-200 A;
(h) base period $T_b2$ of second pulse=3.0-20 ms; and
(i) $I_p1>I_p2$.

Figure 2:
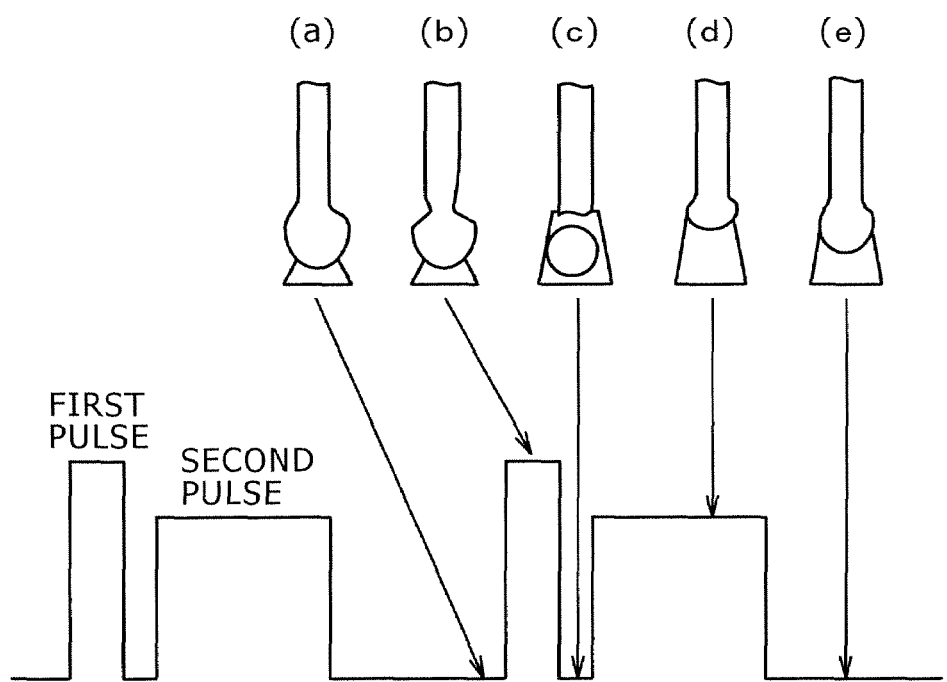
FIG. 2 is a diagram showing a relation between pulse current and a weld transfer unit.

When a pulsed arc welding is carried out under these pulse conditions, as illustrated in FIG. 2, droplet formation at a wire tip and droplet transfer are carried out. The droplet shown in (a) of FIG. 2 is grown during the second pulse peak period after the droplet has been released in a previous pulse cycle. Because a current abruptly decreases at the second pulse base period, the upward force is weakened, so that the droplet is shaped so as to droop at a wire tip as is particularly shown in (a). When getting into the first pulse peak time, the droplet is rapidly released while changing constrictedly in shape as shown in (b) by the electromagnetic pinch force resulting from a peak current passing through the wire. When an arc moves on the side of the wire after the release, the current is lowered during the first pulse base period as shown in (c). In this manner, the generation of particulate spatters due to scattering at the constricted portion of the wire and due to scattering of a remaining molten pool after the release can be significantly reduced. In the second pulse peak period in (d), another droplet is grown under the condition that the second pulse peak current is set to a level where the remaining molten pool on the wire after the release of the droplet is not separated/scattered. While performing formation of a droplet during the second pulse base period of (e), the droplet returns again to the state of (a), thereby realizing a one pulse-one droplet transfer on a regular basis.

As a means for detecting a current arc length, in a previous cycle or in a predetermined previous pulse period, the entire cycle, one of $(T_{up}1, T_p1, T_{down}, T_b1)$ and $(T_{up}2, T_p2, T_b2)$, or more than one period of the $T_{up}1, T_p1, T_{down}, T_b1, T_{up}2, T_p2,$ and $T_b2$ is used. For instance, if output of the power supply is of a constant voltage, a current value in the period is feedbacked; if output of the power supply is of a constant current, a voltage level in the period is feedbacked, so that more than one of $I_p2, I_b2, T_p2,$ and $T_b2$ is prescribed, within ranges not disturbing the one pulse-one droplet transfer. As such, an arc length can be kept at a given level even when the distance between a contact chip and a base metal may have been varied.

In an arc welding, it is important to control the arc length at a given level to maintain the arc stably. To keep the arc length at a given level, a wire feed rate and a wire melting rate must have an almost equal relationship. However, since a wire protruded length varies correspondingly to a change in the distance between a contact chip and a base metal, the calorific value (joule) at the protruded portion is also varied. This calorific value causes a change in the wire melting rate. Therefore, in the practice of the invention, more than one of $I_p2, I_b2, T_p2,$ and $T_b2$ is prescribed to maintain the wire melting rate at a given level.

Through the measurement of a current/voltage waveform during welding, one can understand the release timing of a droplet clearly. In particular, it is also possible to observe the release timing of a droplet by photographing with a high-speed video camera. The most important thing for realizing the one pulse-one droplet transfer in a satisfactory reproducible fashion is to ensure a certain period for $T_b2$. As mentioned above, $T_b2$ is preferably set in a range of 3.0 to 20 ms. For the respective wire feed rates, wire melting rates in the case of independently varying $I_p2, I_b2,$ and $T_p2$ per $T_b2$ are established in a database and, at the same time, a permissible range of each of $I_p2, I_b2,$ and $T_p2$ for ensuring one pulse-one droplet transfer is set by wire feed rates. Moreover, in regard to the respective wire feed rates, if the distance between a chip and a base metal varies, welding voltages are controlled every moment to keep the arc length at a given level while feedbacking a change in the welding voltage or a change in the welding current, and a welding current waveform necessary to maintain the voltage is referred to the database, to thereby make an optimum selection within the permissible range of each parameter and further to realize the arc length control.

The following now describes in detail a second embodiment of the present invention. When a wire feed rate is increased, if the shape of a droplet at a wire tip varies under a pinch force by the first pulse, the electromagnetic pinch force cannot be effectively applied despite the application of an identical pulse, and the release time of a droplet varies, leading to the generation of large-particle spatters. By extending $T_b2$ as much as possible within the range of 3.0 to 20 ms and by maintaining an optimum arc length, the change is attenuated and the shape of the droplet can be uniformalized. Thus, as proper $I_p2, I_b2,$ and $T_p2$ are preset by wire feed rates and more than one of $I_p2, I_b2,$ and $T_p2$ is increased correspondingly to an increase in the wire feed rate, the wire melting rate is resultantly increased to thereby ensure the $T_b2$ within a range of 3.0 to 20 ms.

Figure 3:
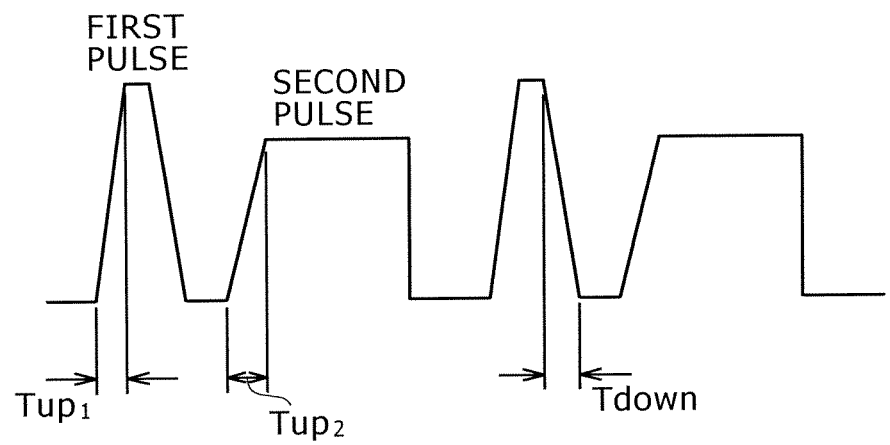
FIG. 3 is a waveform diagram showing a pulse waveform having an upward slope and a downward slope.

Next, a third embodiment of the present invention will be explained in detail with reference to FIG. 3. In a course from a base current to a peak current, an upward slope period of 3 ms or shorter is set for at least one of $T_{up}1$ and $T_{up}2$, so that a sharp increase in the arc force can be prevented to gradually shift an arc occurrence point to the upper portion of a droplet. Accordingly, it becomes possible to obtain a sufficient releasability of the droplet in the first pulse and an enhanced stability of droplet formation in the second pulse. Particularly, this embodiment makes it possible to reduce the influence of a magnetic field over the application of an ordinary square wave pulse, and further to reduce the frequency of occurrence of arc break. Meanwhile, in a course from a peak current to a base current, a downward slope period of 6 ms or shorter is set for $T_{down}$, to thereby prevent a sharp decrease in the pinch force. In consequence, the current is changed to the base current during the release, and the frequency of failure in the release of a droplet can be considerably reduced. In addition, since this embodiment can reduce the influence of a magnetic field better than in the case of applying typical square waves, it is effective for lowering the occurrence frequency of arc break.

The following will now describe in detail a fourth embodiment of the present invention. By detecting the release of droplet during the first pulse peak period or during the subsequent first pulse downward slope period and, at the same time, by immediately switching a current to the first pulse base current or to a predetermined current lower than the current during detecting even during the first pulse peak period or during the first pulse downward slope period, the generation of particulate spatters due to scattering at the constricted portion of a wire or due to scattering of the remaining molten pool after the release can be reduced and, at the same time, the generation of large-particle spatters owing to an error in the droplet release in the first pulse can be markedly reduced.

As a means for detecting the release of a droplet, a reduction in the current when the arc length is increased by the droplet release is measured during the first pulse peak period, for example, if output of the power supply during the first pulse downward slope period is of a constant voltage. Meanwhile, a sharp increase in the arc voltage due to the droplet release is measured during the first pulse peak period, if output of the power supply during the first pulse downward slope period is of a constant current. Moreover, in the first pulse peak period, a first order or second order time differential signal may be used for detecting the release as for the current, voltage, arc impedance and the like during the first pulse downward slope period.

A fifth embodiment of the present invention is now explained in detail. Even though the invention in its first, second and third embodiments has been directed to a one pulse-one droplet transfer form, in this embodiment, the low frequency pulse is superimposed on a high frequency pulse of 500 to 2000 Hz during the entire cycle of the low frequency pulse or one of ($T_{up}1$, $T_p1$, $T_{down}$, $T_b1$) and ($T_{up}2$, $T_p2$, $T_b2$), or more than one period of the $T_{up}1$, $T_p1$, $T_{down}$, $T_b1$, $T_{up}2$, $T_p2$, and $T_b2$. As such, an arc force capable of upwardly pushing the droplet in the second pulse peak period becomes intermittent. When compared with the case where no high frequency pulse exists, the upward force is mitigated. Moreover, as arc rigidity becomes high, the droplet and arc are likely to be axially symmetric, respectively. Since the droplet and arc are both close to axial symmetry, a current path is in axial symmetry as well and an electromagnetic pinch force acting to release a droplet is also likely to be in axial symmetry. In this condition, the release direction of a droplet is very unlikely to be deviated from the wire direction. Because the electromagnetic pinch force is proportional to a square of current, it is enabled to release a droplet at an earlier stage of the peak period over the case where no high frequency pulse is used. Thus, there can be achieved a one pulse-one droplet transfer of very high reproducibility, and spatter and fume generation rates can be remarkably reduced. It is to be noted that the high frequency pulse being applied herein may be effective in either of a square wave or a triangular wave, with no effect being lost even if a square pulse is deformed by the influence of reactance.

Next, the reasons for definitions of numerical ranges of individual pulse parameters are illustrated.

$I_p1$: 300-700 A

The first pulse peak current $I_p1$ contributes greatly to ensuring a satisfactory electromagnetic pinch force in the course of releasing a droplet. If $I_p1$ is smaller than 300 A, the electromagnetic force becomes so weak that the droplet cannot release until after conversion into a bulky mass, thus resulting in deviation from one pulse-one droplet transfer. The contacts of the droplet of a bulky mass with a base metal causes spatter and fume to be generated in large amounts. In contrast, if $I_p1$ exceeds 700 A, the arc force, with which a droplet is pushed upward, becomes so intense that not only a difficulty is involved in regular droplet release, but also apparatus weight and costs increase. As such, a preferred range of $I_p1$ is between 400 A and 600 A.

$T_p1$: 0.3-5.0 ms

The first pulse peak period $T_p1$, similar to $I_p1$, contributes to ensuring a satisfactory electromagnetic pinch force in the course of releasing a droplet. If the $T_p1$ is shorter than 0.3 ms, the electromagnetic force becomes so weak that the droplet cannot release and an n pulse-one droplet transfer is resulted, thereby disturbing the regularity in droplet transfer. In contrast, if the $T_p1$ is longer than 5.0 ms, the occurrence possibility of the release of a droplet in the pulse peak period is increased. In this condition, despite the reduction of current to $I_b1$, suppression effect of particulate spatters disappears and, at the same time, the regularity of droplet transfer is disturbed, thereby generating spatters and fumes in large amounts.

$I_b1$: 30-200 A

The first pulse base current $I_b1$ does not cause arc break in the course of arc shifting toward the wire after the release of a droplet, and contributes greatly to suppress the generation of particulate spatters. If $I_b1$ is smaller than 30 A, arc break and short-circuiting are liable to occur. In contrast, if $I_b1$ exceeds 200 A, the arc force contributing to the remaining molten pool on a wire becomes so great on the moment when the arc shifts toward the wire from a droplet that the generation of particulate spatters cannot be suppressed.

$T_b1$: 0.3-10 ms

The first pulse base period $T_b1$, similar to $I_b1$, does not cause arc break in the course of arc shifting toward the wire after the release of a droplet, and contributes greatly to suppress the generation of particulate spatters. If the $T_b1$ is shorter than 0.3 ms, it is not sufficient to shape the remaining molten pool on the wire and the generation of particulate spatters cannot be suppressed. In contrast, if the $T_b1$ is longer than 10 ms, short-circuiting is liable to occur between a droplet and a weld pool or molten pool, thereby disturbing the regularity of droplet transfer. Moreover, as the upper limit of a welding current is suppressed, welding is not likely to be done at a high wire feed rate.

$I_p2$: 200-600 A

The second pulse peak current $I_p2$ contributes greatly to stable formation of a droplet in a proper size at the step of forming the droplet. If $I_p2$ is smaller than 200 A, sufficient droplets necessary to be released from the wire in a subsequent first pulse are not formed, thereby disturbing the regularity of droplet transfer. Moreover, as the upper limit of a welding current is suppressed, welding is not likely to be done at a high wire feed rate. In contrast, if $I_p2$ exceeds 600 A, the arc force during the droplet formation becomes so great that droplets vibrate irregularly, thereby impeding a stable droplet release. And, at the same time, the remaining molten metal on the wire after the release of droplets separates and scatters at the time of application of the second pulse peak, thereby disturbing the regularity of droplet transfer. Further, because the melting amount of the wire is large, there is a high possibility that the droplet transfer to be carried out again during the second pulse peak period. In addition, there arises a problem in that apparatus weight and costs increase. It will be noted that a preferred range of $I_p2$ is between 300 A and 500 A.

$T_p2$: 1.0-15 ms

The second pulse peak period $T_p2$, similar to $I_p2$, contributes greatly to stable formation of a droplet in a proper size at the step of forming the droplet. If the $T_p2$ is shorter than 1.0 ms, sufficient droplets necessary to be released from the wire in a subsequent first pulse are not formed, thereby disturbing the regularity of droplet transfer. In contrast, if the $T_p2$ is longer than 15 ms, the droplet transfer is very likely to occur again during the second pulse peak period, thereby deviating from the one pulse-one droplet transfer.

$I_b2$: 30-200 A

The second pulse base current $I_b2$ contributes greatly to stable shaping of a droplet without causing arc break in the course of shaping the droplet. If $I_b2$ is smaller than 30 A, arc break and short-circuiting are liable to occur. In contrast, if $I_b2$ exceeds 200 A, the arc force contributing to the droplet formation becomes so great and a melt at the base period becomes so excessive that the resulting droplet fluctuates and shaping cannot be done stably.

$T_b2$: 3.0-20 ms

The second pulse base period $T_b2$, similar to $I_b2$, contributes greatly to stable shaping of a droplet without causing arc break in the course of shaping the droplet. If the $T_b2$ is shorter than 3.0 ms, the droplet cannot be shaped in a satisfactory manner, thus leading to production of impurities in release direction of the droplet. In contrast, if the $T_b2$ exceeds 20 ms, the amount of a melt becomes excessive at the base period and thus, short-circuiting between the droplet and the molten pool is very likely to occur, thereby disturbing the regularity of droplet transfer.

$T_{up}1$: not Longer than 3 ms, $T_{up}2$: not Longer than 3 ms

The first pulse upward slope period $T_{up}1$ contributes greatly to the suppression of spatter generation and the suppression of arc break by preventing a sharp increase in the arc force in the course from the second pulse base current $I_b2$ to the first pulse peak current $I_p1$ to thereby shift the occurrence point of the arc to the upper portion of a droplet. Likewise, the second pulse upward slope period $T_{up}2$ contributes greatly to the suppression of spatter generation and the suppression of arc break by preventing a sharp increase in the arc force in the course from the first pulse base current $I_b1$ to the second pulse peak current $I_p2$ to thereby shift the occurrence point of the arc to the upper portion of a droplet. However, the effects disappear if the $T_{up}1$ and $T_{up}2$ exceed 3.0 ms. In contrast, as droplet release and droplet formation take long, the resulting droplet is rendered coarse in size. Moreover, as the upper limit of a welding current is suppressed, welding is not likely to be done at a high wire feed rate.

$T_{down}$: not Longer than 6 ms

The first pulse downward slope period $T_{down}$ contributes greatly to the suppression of spatter generation and the suppression of arc break by preventing a sharp decrease in the pinch force in the course from the first pulse peak current $I_p1$ to the first pulse base current $I_b1$, so as to significantly reduce the frequency of failure in the release of a droplet due to a change of the current to the base current during the release. Meanwhile, the effects disappear if the $T_{down}$ exceeds 6 ms, and the generation of particulate spatters increases if the current level at the time of release is high. Moreover, as the upper limit of a welding current is suppressed, welding is not likely to be done at a high wire feed rate.

Pulse Frequency of a High Frequency Pulse: 500-2000 Hz

The pulse frequency of a high frequency pulse contributes greatly to mitigation of an arc force that acts to upwardly push a droplet during the pulse peak period and base period and also to improve rigidity of the arc. Rigidity of an arc refers to the nature of an arc to be fixed in a wire extension direction due to a magnetic field generated by a current flowing in the wire, and acts to suppress shaking or vibration of the arc during droplet formation. If the pulse frequency of a high frequency pulse is smaller than 500 Hz, no effect of mitigating the arc force is expected, under which vibrations of a droplet become so great that stable growth and shaping of the droplet is not possible. In contrast, if the pulse frequency of a high frequency pulse exceeds 2000 Hz, the effect of applying the high frequency pulse is so weakened that the upward force of the arc increases, resulting in the unlikelihood of axial symmetry of droplet and arc.

Next, the composition for a consumable electrode wire is described. In the pulsed arc welding of the invention, although there is no specific limitation set forth to the wire composition, a preferred chemical composition for the consumable electrode wire comprises not more than 0.10 wt % of C, 0.20 to 1.0 wt % of Si, 0.50 to 2.0 wt % of Mn, 0.05 to 0.40 wt % of Ti+Al+Zr and the balance being Fe and inevitable impurities. The reasons for the above compositional ranges are described below.

C, 0.10 wt % or Less

C is an element that is important for ensuring strength of a welding metal. When the content exceeds 0.10 wt %, the resulting droplet and molten pool deform and vibrate badly, resulting in an increase in the amount of spatter and fume. Accordingly, the content of C should not be higher than 0.10 wt %.

Si: 0.20 to 1.0 wt %

Si content needs to be at least at 0.20 wt % for use as a deoxidizing agent. If the content of Si is less than 0.20 wt %, the viscosity of a droplet becomes so low that the droplet deforms irregularly by the arc force, resulting in increasing amounts of spatter and fume. In contrast, if the content of Si exceeds 1.0 wt %, slag increases and the viscosity of a droplet becomes too excessive, which may result in deviation from one pulse-one droplet transfer in some cases. Accordingly, the content of Si preferably ranges from 0.20 to 1.0 wt %.

Mn: 0.50 to 2.0 wt % Like Si, Mn is an important element as a deoxidizing agent, and its content should be at least at 0.50 wt %. If the content of Mn is less than 0.50 wt %, the viscosity of a droplet becomes so low that the droplet is caused to be irregularly deformed owing to the arc force, thereby increasing spatter and fume. In contrast, if the content of Mn exceeds 2.0 wt %, wire drawability degrades at the time of manufacturing a welding wire and the viscosity of a droplet becomes too great, which may result in the deviation from one pulse-one droplet transfer in some cases. Accordingly, the content of Mn preferably ranges from 0.50 to 2.0 wt %.

Ti+Al+Zr: 0.05 to 0.40 wt %

Ti, Al and Zr are elements which are important as a deoxidizing agent and for ensuring strength of a welding metal. Particularly in this process, these elements serve to optimize the viscosity of a droplet and bring about an effect of suppressing an unstable behavior. If the content of Ti+Al+Zr is less than 0.05 wt %, such effects as mentioned above become weak, increasing particulate spatters in amount. In contrast, if the content of Ti+Al+Zr exceeds 0.40 wt %, slag detachability and toughness of a welding metal degrade and the viscosity of a droplet becomes so high that the transfer deviates from one pulse-one droplet transfer, resulting in an increase of the amount of spatters and fumes. Accordingly, the content of Ti+Al+Zr preferably ranges from 0.05 to 0.40 wt % in total.

In the pulsed arc welding method of the invention, a consumable electrode wire is preferably not plated with copper on its surface. This copper-free wire surface enables to lower the surface tension at a constricted portion of the droplet, under which the droplet is more likely to release from the wire by means of an electromagnetic force. In this manner, very highly reproducible droplet transfer can be realized.

The pulsed arc welding method of the invention may be very advantageously used for a wire of 1.0-1.6 mm in diameter at a wire feed rate of 9-20 m/min.

The invention is more particularly described by way of examples so as to evidence the effect of the invention. The results of tests are illustrated including examples within the scope of the invention along with comparative examples which are outside the scope of the invention.

EXAMPLES

Figure 4A:
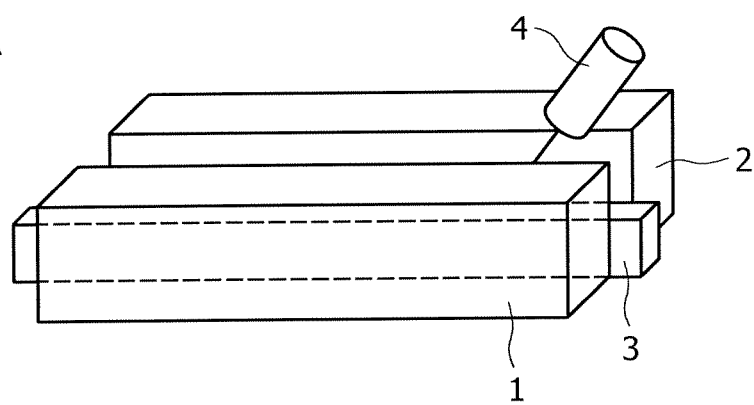
FIGS. 4A and 4B are a perspective view and a schematic cross-sectional view showing how spatter is collected.
Figure 4B:
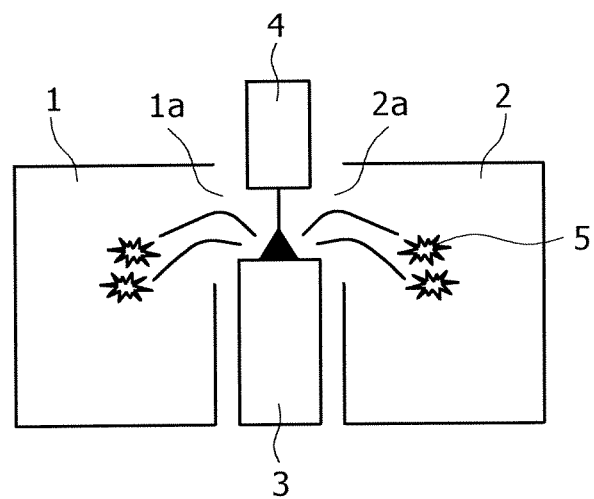

Hereinafter, examples of the first embodiment of the present invention are explained. Using the welding conditions indicated below and pulse parameter values indicated in Table 1 and Table 2, pulsed arc welding was carried out using carbon dioxide gas as a shield gas to measure a generation rate of spatters. More particularly, spatters were collected by carrying out a welding process inside a copper collector box as shown in FIGS. 4A and 4B. FIG. 4A is its perspective view and FIG. 4B is its schematic cross-sectional view. To carry out the welding process, a welding base metal 3 was sandwiched between the copper collector boxes 1 and 2, and a torch 4 was disposed on the welding base metal 3. Spatters 5 generated from welding were then guided into the collector boxes 1 and 2 through passages 1a and 2a prepared on the upper portion of each of the collector boxes 1 and 2.

Welding Conditions
Wire: YGW 11 with a diameter of 1.2 mm of JIS Z3312
Shield gas: $CO_2$ alone
Test sheet: SM490 A
Distance between chip and base metal: 25 mm
Sweepforward angle of torch: 30°
Welding speed: 40 cm/minute
Wire feed rate: 6.0-23.0 m/minute
Welding voltage: A welding voltage that causes short-circuiting at a frequency of 5 times/sec with respect to a 2-3 mm long arc.

In addition, a fume generation rate was measured according to the method of JIS Z 3930, using the welding current among the pulse parameters shown in Table 1 and Table 2 and carbon dioxide gas as a shield gas. The welding conditions are set the same as in measurement of the spatter generation rate described above. Moreover, as a conventional method, spatter and fume generation rates were also measured under the conditions that a welding current=320 A, a welding voltage=36V, and a wire feed rate=15.5 m/minute.

As is shown in Table 1 and Table 2, evaluation was made in such a way that those examples or comparative examples wherein the spatter generation rate was at 4.0 g/minute or less and the fume generation rate was at 400 mg/minute or less were rated as good (○), and those wherein the spatter generation rate exceeded 4.0 g/minute or the fume generation rate exceeded 400 mg/minute were rated as poor (x).

TABLE 1

| No. | | $I_p1$ (A) | $T_p1$ (ms) | $I_b1$ (A) | $T_b1$ (ms) | $I_p2$ (A) | $T_p2$ (ms) | $I_b2$ (A) | $T_b2$ (ms) | Amount of spatter (g/minute) | Amount of fume (g/minute) | Evaluation |
|---|---|---|---|---|---|---|---|---|---|---|---|---|
| Conventional method | | Wire feed rate: 15.5 m/minute, welding current: 320 A, welding voltage: 36 V | | | | | | | | 7.5 | 550 | X |
| Example | 1 | 310 | 4.1 | 120 | 1.1 | 260 | 7.0 | 110 | 5.1 | 2.6 | 335 | ○ |
| | 2 | 500 | 3.0 | 150 | 1.5 | 400 | 6.0 | 140 | 8.0 | 1.9 | 291 | ○ |
| | 3 | 690 | 1.5 | 150 | 5.5 | 390 | 7.5 | 60 | 7.2 | 3.1 | 378 | ○ |
| | 4 | 400 | 0.4 | 50 | 1.7 | 300 | 9.2 | 170 | 4.3 | 2.7 | 355 | ○ |
| | 5 | 550 | 4.9 | 110 | 7.8 | 450 | 2.8 | 90 | 11.0 | 2.3 | 320 | ○ |
| | 6 | 600 | 1.1 | 35 | 2.7 | 320 | 10.8 | 50 | 9.1 | 1.8 | 289 | ○ |
| | 7 | 530 | 2.1 | 195 | 2.0 | 470 | 8.3 | 150 | 6.3 | 1.9 | 280 | ○ |
| | 8 | 510 | 3.0 | 120 | 0.3 | 350 | 9.1 | 80 | 12.2 | 3.4 | 389 | ○ |
| | 9 | 580 | 2.3 | 70 | 9.5 | 490 | 5.3 | 70 | 16.2 | 1.6 | 275 | ○ |
| | 10 | 420 | 2.5 | 90 | 1.8 | 220 | 12.1 | 130 | 8.3 | 2.3 | 338 | ○ |
| | 11 | 450 | 2.5 | 120 | 2.0 | 400 | 5.0 | 140 | 9.0 | 2.0 | 287 | ○ |
| | 12 | 650 | 0.9 | 170 | 2.2 | 590 | 3.2 | 120 | 10.4 | 3.9 | 391 | ○ |
| | 13 | 590 | 3.0 | 80 | 2.5 | 500 | 1.1 | 120 | 9.2 | 2.8 | 355 | ○ |
| | 14 | 550 | 3.5 | 60 | 3.8 | 410 | 14.8 | 130 | 8.6 | 3.6 | 383 | ○ |
| | 15 | 650 | 2.7 | 150 | 7.5 | 370 | 7.1 | 30 | 17.2 | 1.7 | 281 | ○ |
| | 16 | 550 | 4.0 | 100 | 9.0 | 490 | 6.2 | 190 | 14.5 | 2.6 | 339 | ○ |
| | 17 | 570 | 3.5 | 120 | 2.8 | 530 | 4.3 | 90 | 3.1 | 3.9 | 378 | ○ |
| | 18 | 600 | 2.8 | 170 | 5.2 | 500 | 5.5 | 100 | 19.5 | 2.8 | 345 | ○ |

TABLE 2

| No. | | $I_p1$ (A) | $T_p1$ (ms) | $I_b1$ (A) | $T_b1$ (ms) | $I_p2$ (A) | $T_p2$ (ms) | $I_b2$ (A) | $T_b2$ (ms) | Amount of spatter (g/minute) | Amount of fume (g/minute) | Evaluation |
|---|---|---|---|---|---|---|---|---|---|---|---|---|
| Comparative Example | 19 | 280 | 0.5 | 40 | 1.2 | 450 | 7.1 | 50 | 10.2 | 4.5 | 461 | X |
| | 20 | 720 | 2.0 | 120 | 2.5 | 500 | 6.2 | 100 | 16.4 | 6.5 | 588 | X |
| | 21 | 380 | 0.2 | 50 | 6.0 | 490 | 4.5 | 180 | 12.3 | 5.0 | 517 | X |
| | 22 | 470 | 5.2 | 140 | 0.8 | 230 | 13.7 | 80 | 9.1 | 4.3 | 455 | X |
| | 23 | 450 | 3.5 | 20 | 3.0 | 500 | 2.5 | 140 | 3.9 | 6.8 | 593 | X |

TABLE 2-continued

| No. | $I_p1$ (A) | $T_p1$ (ms) | $I_b1$ (A) | $T_b1$ (ms) | $I_p2$ (A) | $T_p2$ (ms) | $I_b2$ (A) | $T_b2$ (ms) | Amount of spatter (g/minute) | Amount of fume (g/minute) | Evaluation |
|---|---|---|---|---|---|---|---|---|---|---|---|
| 24 | 530 | 2.3 | 220 | 8.0 | 270 | 12.3 | 110 | 8.8 | 4.2 | 459 | X |
| 25 | 500 | 1.0 | 160 | 0.2 | 500 | 1.5 | 190 | 15.2 | 5.2 | 528 | X |
| 26 | 300 | 2.8 | 150 | 10.5 | 520 | 10.8 | 150 | 13.2 | 6.9 | 657 | X |
| 27 | 620 | 1.5 | 110 | 2.8 | 190 | 3.2 | 70 | 4.9 | 4.5 | 480 | X |
| 28 | 550 | 3.3 | 170 | 0.5 | 610 | 7.6 | 120 | 19.1 | 8.2 | 751 | X |
| 29 | 350 | 2.5 | 150 | 2.0 | 400 | 0.8 | 170 | 16.7 | 6.1 | 597 | X |
| 30 | 600 | 4.5 | 70 | 7.3 | 530 | 15.4 | 130 | 6.8 | 8.9 | 604 | X |
| 31 | 490 | 3.0 | 180 | 3.5 | 310 | 14.2 | 20 | 14.3 | 4.7 | 490 | X |
| 32 | 400 | 3.7 | 90 | 8.9 | 550 | 4.0 | 220 | 8.0 | 5.1 | 521 | X |
| 33 | 650 | 4.0 | 90 | 4.5 | 550 | 8.2 | 120 | 2.0 | 8.7 | 598 | X |
| 34 | 520 | 4.7 | 100 | 4.9 | 350 | 5.3 | 90 | 21.1 | 4.5 | 473 | X |

As is apparent in Table 1, Example Nos. 1 to 18 are within the scope of the invention, and all of them were rated as good, having low generation rates of spatter and fume.

On the other hand, Comparative Example Nos. 19 to 34 are outside the scope of the invention and are all rated as poor, having high generation rates of spatter and fume. First of all, in Comparative Example No. 19 has $I_p1$ below the lower limit defined in the present invention, so that a droplet could not be released until it would be formed as a bulky mass, thereby resulting in deviation from one pulse-one droplet transfer and increasing the generation of spatters and fumes because of irregular short-circuiting. Comparative Example No. 20 has $I_p1$ above the upper limit defined in the present invention, meaning that the arc force serving to push a droplet upward at the peak period is too great to realize regular droplet transfer and thus, resulting in an increase in the amount of spatters and fumes. Comparative Example No. 21 has $T_p1$ below the lower limit defined in the present invention, so that a droplet could not be released until it would be formed as a bulky mass, thereby resulting in deviation from one pulse-one droplet transfer and increasing the generation of spatters and fumes because of irregular short-circuiting. Comparative Example No. 22 has $T_p1$ above the upper limit defined in the present invention, so that the droplet release occurred frequently in a peak period, resulting in an increase in the amount of particulate spatters and fumes. Comparative Example No. 23 has $I_b1$ below the lower limit defined in the present invention, so that arc break and short-circuiting occurred frequently, resulting in an increase in the amount of particulate spatters and fumes. Comparative Example No. 24 has $I_b1$ above the upper limit defined in the present invention, so that the remaining molten pool on the side of a wire scattered on the moment an arc shifted from a droplet to the wire, resulting in an increase in the amount of spatters and fumes. Comparative Example No. 25 has $T_b1$ below the lower limit defined by the present invention, so that the remaining molten pool on the side of a wire was not shaped in a satisfactory manner on the moment an arc shifted from a droplet to the wire, resulting in an increase in the amount of spatters and fumes. Comparative Example No. 26 has $T_b1$ above the upper limit defined by the present invention, so that short-circuiting was liable to occur between a droplet and the molten pool, resulting in an increase in the amount of spatters and fumes.

Comparative Example No. 27 has $I_p2$ below the lower limit defined by the present invention, so that sufficient droplets to be released from a wire in a subsequent first pulse were not formed and the regularity of droplet transfer was disturbed, resulting in an increase in the amount of spatters and fumes. Comparative Example No. 28 has $I_p2$ above the upper limit defined by the present invention, so that the arc force became so great during the droplet formation that droplets vibrate irregularly, thereby disturbing the regularity of droplet transfer. In addition, the droplet transfer was carried out in the second pulse period in some cases, resulting in an increase in the amount of spatters and fumes. Comparative Example No. 29 has $T_p2$ below the lower limit defined by the present invention, so that stable formation of a droplet in a proper size was not attained at the step of forming the droplet and the regularity of droplet transfer was disturbed, resulting in an increase in the amount of spatters and fumes. Comparative Example No. 30 has $T_p2$ above the upper limit defined by the present invention, so that the droplet transfer was carried out in the second pulse period in some cases, resulting in an increase in the amount of spatters and fumes. Comparative Example No. 31 has $I_b2$ below the lower limit defined by the present invention, so that arc break and short-circuiting occurred frequently, resulting in an increase in the amount of spatters and fumes. Comparative Example No. 32 has $I_b2$ above the upper limit defined by the present invention, so that the arc force contributing to the droplet formation became so great that droplets could not be shaped in stably manner, thereby disturbing the regularity of droplet transfer and further increasing the generation of spatters and fumes. Comparative Example No. 33 has $T_b2$ below the lower limit defined by the present invention, so that stable formation of a droplet in a proper size was not performed in stably manner and the regularity of droplet transfer was disturbed, resulting in an increase in the amount of spatters and fumes. Comparative Example No. 34 has $T_b2$ above the upper limit defined by the present invention, so that short-circuiting easily occurred between the droplet and the molten pool, resulting in an increase in the amount of particulate spatters and fumes.

Hereinafter, an example of the second embodiment of the present invention is explained. Basic welding conditions are same as the conditions used in the example of the first embodiment. Using the welding conditions indicated below and pulse parameter values indicated in Table 3 and Table 4, pulsed arc welding was carried out using carbon dioxide gas as a shield gas to measure generation rates of spatters and fumes. The spatter collection method is described in FIG. 4. In addition, the method of JIS Z 3930 used in the example of the first embodiment was applied again for measurement of fumes. As is shown in Table 3 and Table 4, evaluation was made in a similar way that those examples or comparative examples wherein the spatter generation rate was at 4.0 g/minute or less and the fume generation rate was at 400 mg/minute were rated as good (○), and those wherein the spatter generation rate exceeded 4.0 g/minute or the fume generation rate exceeded 400 mg/minute were rated as poor (X).

TABLE 3

| | No. | $I_p1$ (A) | $T_p1$ (ms) | $I_b1$ (A) | $T_b1$ (ms) | $I_p2$ (A) | $T_p2$ (ms) | $I_b2$ (A) | $T_b2$ (ms) | Feed rate (m/min) | Amount of spatter (g/minute) | Amount of fume (g/minute) | Evaluation |
|---|---|---|---|---|---|---|---|---|---|---|---|---|---|
| Example | 35 | 540 | 2.2 | 160 | 1.5 | 400 | 5.0 | 160 | 7.2 | 13.8 | 1.7 | 285 | ◯ |
| | 36 | 540 | 2.2 | 160 | 1.5 | 400 | 5.0 | 160 | 6.4 | 14.3 | 1.6 | 283 | ◯ |
| | 37 | 540 | 2.2 | 160 | 1.5 | 420 | 5.0 | 170 | 5.4 | 15.5 | 1.8 | 291 | ◯ |
| | 38 | 540 | 2.2 | 160 | 1.5 | 420 | 5.0 | 160 | 4.2 | 16.5 | 1.9 | 289 | ◯ |
| | 39 | 540 | 2.2 | 160 | 1.5 | 440 | 5.0 | 160 | 3.5 | 17.7 | 2.3 | 302 | ◯ |
| | 40 | 540 | 2.2 | 160 | 1.5 | 400 | 7.0 | 160 | 8.2 | 13.8 | 1.5 | 274 | ◯ |
| | 41 | 540 | 2.2 | 160 | 1.5 | 400 | 5.0 | 160 | 9.2 | 12.8 | 1.4 | 270 | ◯ |
| | 42 | 540 | 2.2 | 160 | 1.5 | 400 | 5.0 | 160 | 10.4 | 12.3 | 1.3 | 265 | ◯ |
| | 43 | 540 | 2.2 | 160 | 1.5 | 400 | 8.0 | 170 | 6.3 | 14.9 | 1.7 | 280 | ◯ |
| | 44 | 540 | 2.2 | 160 | 1.5 | 400 | 9.0 | 160 | 5.0 | 15.8 | 1.7 | 283 | ◯ |
| | 45 | 540 | 2.2 | 160 | 1.5 | 400 | 9.0 | 170 | 3.8 | 16.6 | 2.1 | 294 | ◯ |

TABLE 4

| | No. | $I_p1$ (A) | $T_p1$ (ms) | $I_b1$ (A) | $T_b1$ (ms) | $I_p2$ (A) | $T_p2$ (ms) | $I_b2$ (A) | $T_b2$ (ms) | Feed rate (m/min) | Amount of spatter (g/minute) | Amount of fume (g/minute) | Evaluation |
|---|---|---|---|---|---|---|---|---|---|---|---|---|---|
| Comparative Example | 46 | 470 | 5.0 | 160 | 2.5 | 470 | 7.0 | 160 | 14.0 | 12.5 | 4.2 | 452 | X |
| | 47 | 500 | 5.0 | 160 | 2.5 | 500 | 7.0 | 160 | 13.0 | 13.9 | 4.1 | 463 | X |
| | 48 | 500 | 5.0 | 160 | 2.5 | 500 | 7.0 | 160 | 11.0 | 14.6 | 4.3 | 455 | X |
| | 49 | 470 | 5.0 | 160 | 2.5 | 470 | 7.0 | 160 | 9.0 | 14.2 | 4.5 | 471 | X |
| | 50 | 500 | 5.0 | 160 | 2.5 | 500 | 6.0 | 160 | 8.0 | 15.5 | 4.7 | 459 | X |
| | 51 | 500 | 4.0 | 160 | 2.5 | 500 | 5.0 | 160 | 7.0 | 14.9 | 4.6 | 463 | X |
| | 52 | 470 | 4.0 | 160 | 2.5 | 470 | 4.0 | 160 | 6.0 | 13.7 | 4.3 | 443 | X |
| | 53 | 500 | 4.0 | 160 | 2.5 | 500 | 4.0 | 160 | 5.0 | 15.6 | 5.1 | 510 | X |
| | 54 | 500 | 3.0 | 160 | 2.5 | 500 | 3.0 | 160 | 4.0 | 14.8 | 5.3 | 521 | X |
| | 55 | 500 | 2.5 | 160 | 2.5 | 500 | 3.0 | 160 | 3.0 | 15.7 | 5.5 | 525 | X |
| | 56 | 500 | 1.8 | 160 | 2.5 | 500 | 3.0 | 160 | 2.0 | 15.8 | 5.4 | 532 | X |
| | 57 | 500 | 0.8 | 160 | 2.5 | 500 | 2.0 | 160 | 1.0 | 14.4 | 6.1 | 603 | X |

As is apparent in Table 3, Example Nos. 35 to 45 are within the scope of the invention. In order to ensure $T_b2$ to fall within a range of 3.0 to 20 ms according to an increase in the wire feed rate, more than one of $I_p2$, $T_p2$, and $I_b2$ were increased to raise the wire melting rate. As such, all of them were low in the generation rates of spatters and fumes.

Figure 5:
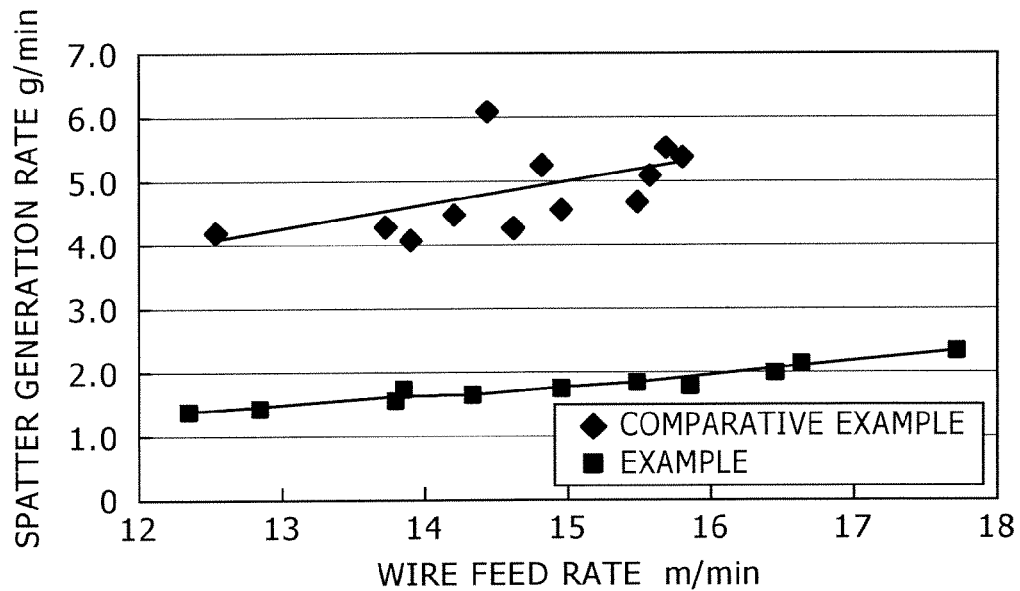
FIG. 5 is a graph showing a relation between a wire feed rate and a spatter generation rate.
Figure 6:
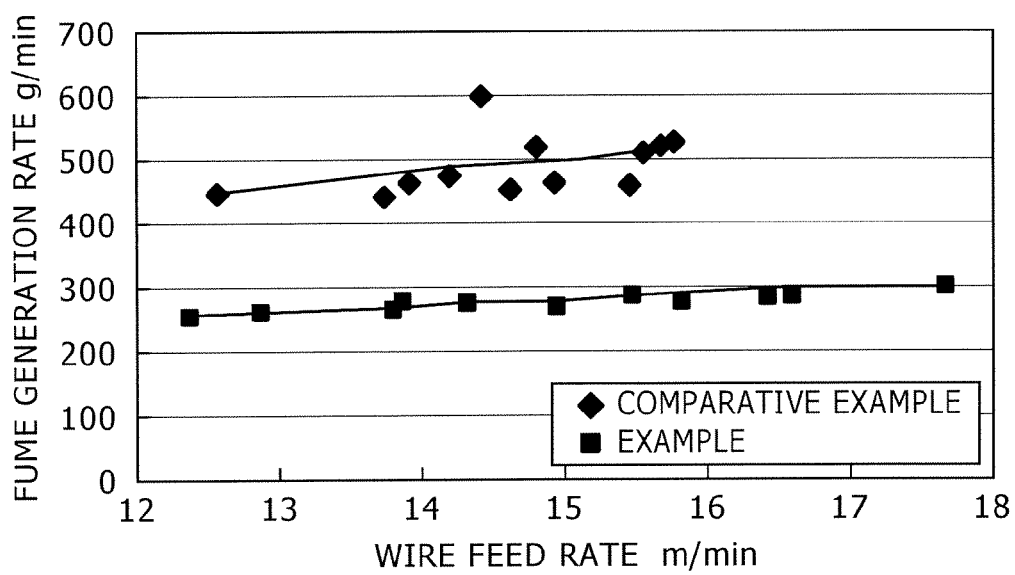
FIG. 6 is a graph showing a relation between a wire feed rate and a fume generation rate.

On the other hand, in Comparative Example Nos. 46 to 57 of Table 4, $I_p1$ and $I_p2$ were set to the same level, and a second pulse in which a pulse and base periods were set short according to an increase in the wire feed quantity and a first pulse with a pulse period shorter than the second pulse were used. Before an electromagnetic pinch force by the first pulse is applied, the droplet shaping at a wire tip was not stable and the electromagnetic pinch force was not applied effectively, either. Also, a difficulty was involved in the regularity of one pulse-one droplet transfer and therefore, the generation of large-particle spatters and fumes was increased. FIGS. 5 and 6 illustrate a relation between wire feed rates and generation rates of spatters and fumes in the case of Example Nos. 35 to 45 and in the case of Comparative Example Nos. 46 to 57, respectively.

Hereinafter, examples of the third, fourth and fifth embodiments of the present invention are explained. Using the welding conditions indicated below and pulse parameter values indicated in Table 5 and Table 6, pulsed arc welding was carried out using carbon dioxide gas as a shield gas to measure generation rates of spatters and fumes. The spatter collection method is described in FIG. 4. In addition, the method of JIS Z 3930 was used again for measurement of fumes. As is shown in Table 5 and Table 6, evaluation was made that those examples or comparative examples wherein the spatter generation rate was at 2.0 g/minute or less, the fume generation rate was at 300 mg/minute, and no occurrence of arc break were rated as good (◯), and those wherein the spatter generation rate exceeded 2.0 g/minute, the fume generation rate exceeded 300 mg/minute or any occurrence of arc break were rated as poor (X). The evaluation this time is stricter than the evaluation criteria shown in Table 1 and Table 2. Moreover, the superposition of a high frequency pulse in fourth example was carried out in the entire period, or one or more than two of ($T_{up}1$, $T_p1$, $T_{down}$, $T_b1$) and ($T_{up}2$, $T_p2$, $T_b2$). Table 5 and Table 6 only described pulse frequencies.

Welding Conditions

Size of wire: 1.2 mm in diameter

Shield gas: $CO_2$

Test sheet: SM490 A

Distance between chip and base metal: 25 mm

Sweepforward angle of torch: 30°

Wire feed rate: 13-15 m/minute

Welding speed: 40 cm/minute $I_p1$: 560 A $T_p1$: 2.0 ms $I_b1$: 150 A $T_b1$: 1.5 ms $I_p2$: 450 A $T_p2$: 5.0 ms $I_b2$: 150 A $T_b2$: 8.0 ms

TABLE 5

| | No. | $T_{up}1$ (ms) | $T_{down}$ (ms) | $T_{up}2$ (ms) | Release detection | High frequency pulse frequency (Hz) | Amount of spatter (g/minute) | Amount of fume (g/minute) | Arc break count (/5 s) | Evaluation |
|---|---|---|---|---|---|---|---|---|---|---|
| Example | 35 | 0.5 | 2.5 | 0.5 | No | — | 1.7 | 273 | 0 | ○ |
| | 36 | 3.0 | 0.5 | 1.0 | No | — | 1.9 | 292 | 0 | ○ |
| | 37 | 1.0 | 4.5 | 0.5 | No | — | 1.7 | 285 | 0 | ○ |
| | 38 | 0.5 | 6.0 | 2.0 | No | — | 1.6 | 283 | 0 | ○ |
| | 39 | 0.8 | 1.3 | 0.5 | No | — | 1.3 | 276 | 0 | ○ |
| | 40 | 0.5 | 5.5 | 3.0 | No | — | 1.5 | 275 | 0 | ○ |
| | 41 | — | — | — | No | — | 1.2 | 265 | 0 | ○ |
| | 42 | 1.0 | 2.5 | 0.5 | No | — | 0.9 | 251 | 0 | ○ |
| | 43 | — | — | — | No | 500 | 1.6 | 278 | 0 | ○ |
| | 44 | — | — | — | No | 2000 | 1.5 | 280 | 0 | ○ |
| | 45 | 0.5 | 2.5 | 1.0 | No | 1000 | 1.3 | 272 | 0 | ○ |
| | 46 | — | — | — | Yes | 700 | 0.9 | 258 | 0 | ○ |
| | 47 | 1.0 | 3.7 | 1.0 | Yes | 1200 | 0.5 | 255 | 0 | ○ |

TABLE 6

| | No. | $T_{up}1$ (ms) | $T_{down}$ (ms) | $T_{up}2$ (ms) | Release detection | High frequency pulse frequency (Hz) | Amount of spatter (g/minute) | Amount of fume (g/minute) | Arc break count (/5 s) | Evaluation |
|---|---|---|---|---|---|---|---|---|---|---|
| Comparative | 48 | — | — | — | No | — | 2.4 | 333 | 3 | X |
| Example | 49 | — | 0.8 | 1.5 | No | — | 2.2 | 328 | 2 | X |
| | 50 | 3.3 | 2.5 | 1.0 | No | — | 2.6 | 341 | 0 | X |
| | 51 | 1.0 | — | 0.5 | No | — | 2.5 | 323 | 0 | X |
| | 52 | 0.5 | 6.2 | 1.0 | No | — | 2.1 | 318 | 0 | X |
| | 53 | 1.0 | 4.5 | — | No | — | 2.5 | 327 | 3 | X |
| | 54 | 1.5 | 0.5 | 3.3 | No | — | 2.2 | 330 | 0 | X |
| | 55 | — | — | — | No | 450 | 3.4 | 382 | 2 | X |
| | 56 | — | — | — | No | 2200 | 2.5 | 335 | 3 | X |
| | 57 | 0.5 | 3.0 | 0.5 | No | 480 | 3.3 | 376 | 0 | X |
| | 58 | 1.0 | 1.5 | 0.5 | No | 2200 | 2.6 | 330 | 0 | X |
| | 59 | — | — | — | Yes | 470 | 2.3 | 331 | 0 | X |
| | 60 | 0.5 | 2.5 | 1.0 | Yes | 450 | 2.2 | 321 | 0 | X |
| | 61 | 1.0 | 2.8 | 0.5 | Yes | 2200 | 2.1 | 315 | 0 | X |

Example Nos. 35 to 40 in Table 5 satisfy the requirements defined in an aspect of the invention, wherein a slope period was set in the first and second pulse upward periods $T_{up}1$ and $T_{up}2$ and in the first pulse downward period $T_{down}$, respectively.

Example Nos. 41 and 42 are of the third embodiment, wherein Example No. 41 was subjected to the droplet release detecting test and Example No. 42 was also subjected to the droplet release detecting test while the slope period was set in the first and second pulse upward periods and in the first pulse downward period, respectively.

Example Nos. 43 to 47 are of the third embodiment. Example Nos. 43 and 44 had a high frequency pulse superposed; Example No. 45 had a high frequency pulse superposed while the slope period was being set in the first and second pulse upward periods and in the first pulse downward period; Example No. 46 had a high frequency pulse superposed while it was being subjected to the droplet release detecting test; and Example No. 47 had a high frequency pulse superposed after the droplet release detecting test was conducted while the slope period was being set in the first and second pulse upward periods and in the first pulse downward period.

Next, Comparative Examples shown in Table 6 are explained. It should be noted that Comparative Example Nos. 48 to 61 satisfy the requirements defined in an aspect of the invention. Comparative Example No. 48 wherein the slope period was not set in the first and second pulse upward periods and in the first pulse downward period caused the generation of large-particle spatters and fumes when the release was failed. Moreover, an arc break occurred. A comparison between Example No. 41 and Comparative Example No. 48 shows that Comparative Example No. 48 having no release detected generated particulate spatters due to a slight difference in the release timing. Comparative Example No. 48, unlike Example Nos. 43 and 44, had no high frequency pulse, so the upward force of a droplet was slightly large and the release direction of the droplet was severely deviated from the wire direction in some cases.

Comparative Example No. 49 has not set the first pulse upward period $T_{up}1$ so that large-particle spatters and fumes were generated when the release was failed due to a sharp increase in the arc force in the course from the second base current to the first pulse peak current. Also, an arc break occurred. Comparative Example No. 50 has the first pulse upward period $T_{up}1$ above the upper limit defined by the present invention, so that the release took long time, causing an error in the release due to a coarse droplet. Comparative Example No. 51 has not set the first pulse downward period $T_{down}$, so that large-particle spatters and fumes were generated when the current changed to the base current during the release and the release was failed due to a sharp decrease in the pinch force in the course from the first pulse peak current to the first base current. Comparative Example No. 52 has the first pulse downward period $T_{down}$ above the upper limit defined by the present invention, so that the current level was often high at the time of the release, resulting in an increase in the amount of particulate spatters. Comparative Example No. 53 has not set the second pulse upward period $T_{up}2$, so that spatters and fumes were generated due to scattering of the remaining molten pool due to a sharp increase in the arc force in the course from the first base current to the second pulse peak current. Moreover, an arc break occurred. Comparative Example No. 54 has the second pulse upward period $T_{up}2$ above the upper limit defined by the present invention, so that the droplet formation took long time, causing an error in the release due to a coarse droplet. Comparative Example No. 55 has the frequency of a high frequency pulse below the lower limit defined by the present invention, so that, compared with Example No. 43, the mitigation effect of an arc force was little and the vibration of a droplet was great. This made it impossible for a stable growth and shaping of the droplet, resulting in an increase in the amount of spatters. In addition, since the slope period has not been set in the first and second pulse upward periods and in the first pulse downward period, large-particle spatters and fumes were generated when the release was failed, and an arc break also occurred. Comparative Example No. 56 has the frequency of a high frequency pulse above the upper limit defined by the present invention, so that, compared with Example No. 43, the high frequency pulse application effect was weak, the upward force by an arc increased, and thus the axial symmetry between the droplet and the arc was not achieved, resulting in an increase in the amount of spatters. In addition, since the slope period has not been set in the first and second pulse upward periods and in the first pulse downward period, large-particle spatters and fumes were generated when the release was failed, and an arc break also occurred. Comparative Example No. 57 has the frequency of a high frequency pulse below the lower limit defined by the present invention. Despite the fact that the slope period was set in the first and second pulse upward periods and in the first pulse downward period, if compared with Example No. 45, the mitigation effect of an arc force in the case of Comparative Example No. 57 was little and the vibration of a droplet thereof was great. This made it impossible for a stable growth and shaping of the droplet, resulting in an increase in the amount of spatters. Comparative Example No. 58 has the frequency of a high frequency pulse above the upper limit defined by the present invention. Despite the fact that the slope period was set in the first and second pulse upward periods and in the first pulse downward period, if compared with Example No. 45, the high frequency pulse application effect in the case of Comparative Example No. 58 was weak, the upward force by an arc increased, and thus the axial symmetry between the droplet and the arc was not achieved, resulting in an increase in the amount of spatters. Comparative Example No. 59 has the frequency of a high frequency pulse below the lower limit defined by the present invention. Even though it was being subjected to the droplet release detecting test, if compared with Example No. 46, the mitigation effect of an arc force in the case of Comparative Example No. 59 was little and the vibration of a droplet thereof was great. This made it impossible for a stable growth and shaping of the droplet, resulting in an increase in the amount of spatters. Comparative Example No. 60 has the frequency of a high frequency pulse below the lower limit defined by the present invention. Despite the fact that the slope period was set in the first and second pulse upward periods and in the first pulse downward period, if compared with Example No. 47, the mitigation effect of an arc force in the case of Comparative Example No. 60 was little and the vibration of a droplet thereof was great. This made it impossible for a stable growth and shaping of the droplet, resulting in an increase in the amount of spatters. Comparative Example No. 61 has the frequency of a high frequency pulse above the upper limit defined by the present invention. Despite the fact that the slope period was set in the first and second pulse upward periods and in the first pulse downward period, if compared with Example No. 47, the high frequency pulse application effect in the case of Comparative Example No. 61 was weak, the upward force by an arc increased, and thus the axial symmetry between the droplet and the arc was not achieved, resulting in an increase in the amount of spatters.

Hereinafter, examples showing effect of composition for a wire in the present invention are explained. Using the welding conditions indicated below and pulse parameter values indicated in Table 7 and Table 8, pulsed arc welding was carried out using carbon dioxide gas as a shield gas to measure generation rates of spatters and fumes. The spatter collection method and the fume measurement method same as the above were used again. As is apparent in Table 7 and Table 8, evaluation was made that those examples or comparative examples wherein the spatter generation rate was at 2.0 g/minute or less and the fume generation rate was at 300 mg/minute or less were rated as good (○), and those wherein the spatter generation rate exceeded 2.0 g/minute or the fume generation rate exceeded 300 mg/minute were rated as poor (X).

Welding Conditions
Size of wire: 1.2 mm in diameter
Shield gas: $CO_2$
Test sheet: SM490 A
Distance between chip and base metal: 25 mm
Sweepforward angle of torch: 30°
Welding speed: 40 cm/minute
Wire feed rate: 15.5 m/minute
$I_p1$: 560 A
$T_p1$: 2.0 ms
$I_b1$: 150 A
$T_b1$: 1.5 ms
$I_p2$: 450 A
$T_p2$: 5.0 ms
$I_b2$: 150 A
$T_b2$: 8.0 ms

TABLE 7

| | No. | C (Wt %) | Si (Wt %) | Mn (Wt %) | Ti (Wt %) | Al (Wt %) | Zr (Wt %) | Ti + Al + Zr (Wt %) | Copper Plated | Amount of spatter (g/minute) | Amount of fume (g/minute) | Evaluation |
|---|---|---|---|---|---|---|---|---|---|---|---|---|
| Example | 65 | 0.05 | 0.60 | 1.25 | 0.1 | — | .05 | 0.15 | Yes | 1.5 | 279 | ○ |
| | 66 | 0.05 | 0.62 | 1.23 | .05 | 0.1 | — | 0.15 | No | 0.8 | 251 | ○ |
| | 67 | 0.07 | 0.22 | 1.15 | .05 | .04 | — | 0.09 | Yes | 1.6 | 280 | ○ |
| | 68 | 0.05 | 0.90 | 1.33 | .05 | — | 0.1 | 0.15 | Yes | 1.6 | 283 | ○ |
| | 69 | 0.05 | 0.88 | 1.35 | 0.1 | .05 | — | 0.15 | No | 0.8 | 260 | ○ |

TABLE 7-continued

| No. | | C (Wt %) | Si (Wt %) | Mn (Wt %) | Ti (Wt %) | Al (Wt %) | Zr (Wt %) | Ti + Al + Zr (Wt %) | Copper Plated | Amount of spatter (g/minute) | Amount of fume (g/minute) | Evaluation |
|---|---|---|---|---|---|---|---|---|---|---|---|---|
| | 70 | 0.08 | 0.40 | 0.55 | — | .05 | .04 | 0.08 | Yes | 1.0 | 255 | ○ |
| | 71 | 0.04 | 0.82 | 1.92 | 0.1 | .04 | .04 | 0.18 | Yes | 1.5 | 275 | ○ |
| | 72 | 0.03 | 0.75 | 1.22 | .05 | — | — | 0.05 | Yes | 1.2 | 263 | ○ |
| | 73 | 0.03 | 0.72 | 1.20 | — | .05 | — | 0.05 | No | 0.8 | 262 | ○ |
| | 74 | 0.04 | 0.65 | 1.55 | 0.1 | — | 0.1 | 0.20 | No | 1.8 | 291 | ○ |
| | 75 | 0.08 | 0.78 | 1.36 | 0.1 | 0.1 | 0.15 | 0.35 | Yes | 1.7 | 298 | ○ |

TABLE 8

| | No. | C (Wt %) | Si (Wt %) | Mn (Wt %) | Ti (Wt %) | Al (Wt %) | Zr (Wt %) | Ti + Al + Zr (Wt %) | Copper Plated | Amount of spatter (g/minute) | Amount of fume (g/minute) | Evaluation |
|---|---|---|---|---|---|---|---|---|---|---|---|---|
| Comparative | 76 | 0.11 | 0.60 | 1.25 | — | 0.1 | .05 | 0.15 | Yes | 2.2 | 328 | X |
| Example | 77 | 0.07 | 0.18 | 1.15 | .05 | .04 | — | 0.09 | Yes | 2.9 | 341 | X |
| | 78 | 0.05 | 1.10 | 1.33 | 0.1 | — | .05 | 0.15 | Yes | 3.2 | 384 | X |
| | 79 | 0.05 | 1.09 | 1.35 | .05 | — | 0.1 | 0.15 | No | 2.8 | 345 | X |
| | 80 | 0.05 | 0.40 | 0.45 | .04 | .04 | — | 0.08 | Yes | 3.9 | 395 | X |
| | 81 | 0.06 | 0.82 | 2.05 | — | 0.1 | .08 | 0.18 | Yes | 3.3 | 381 | X |
| | 82 | 0.07 | 0.80 | 2.13 | .07 | .05 | .05 | 0.17 | No | 2.7 | 350 | X |
| | 83 | 0.05 | 0.75 | 1.22 | — | — | — | — | Yes | 3.7 | 389 | X |
| | 84 | 0.05 | 0.75 | 1.22 | .03 | — | — | 0.03 | No | 3.8 | 375 | X |
| | 85 | 0.07 | 0.65 | 1.55 | 0.2 | .15 | 0.1 | 0.45 | Yes | 3.2 | 391 | X |

Example Nos. 65 to 75 in Table 7 satisfy the requirements defined in an aspect of the invention, under which welding is carrier out in a satisfactory manner, with amounts of spatter and fume being low, respectively. Especially, Example No. 65 compared to Example No. 66, Example No. 68 compared to Example No. 69, and Example No. 72 compared to Example No. 73 were wires having similar compositions, yet no copper plating being performed thereon. They exhibited reduced surface tensions in the constricted portion of a droplet and the droplet in each case was more readily released from the wire by the electromagnetic pinch force.

Accordingly, non-plating resultantly enabled droplet transfer of very high reproducibility and further reduction of spatters in amount.

On the other hand, Comparative Example No. 76 has the C content in the wire above the upper limit of the invention, so that a droplet and molten pond deformed and vibrate violently, resulting in an increase in the amount of spatters. Comparative Example No. 77 has the Si content in the wire below the lower limit, so that the droplet became so low in viscosity that the droplets suffered irregular deformation due to the arc force, resulting in an increase in the amount of spatters. Comparative Example Nos. 78 and 79 have the Si content in the wire above the upper limit, so that the resulting droplet became too high in viscosity, resulting in deviation from one pulse-one droplet transfer and an increase in the amount of spatters. Comparative Example No. 80 has the Mn content in the wire below the lower limit, so that the resulting droplet became so low in viscosity that the droplet irregularly deforms due to the arc force, resulting in an increase in the amount of spatters. Comparative Example Nos. 81 and 82 have the Mn content in the wire above the upper limit, so that the resulting droplet became too high in viscosity, resulting in deviation from one pulse-one droplet transfer and an increase in the amount of spatters. Comparative Example Nos. 83 and 84 have the Ti+Al+Zr content in the wire below the lower limit, so that the droplet suffered irregular deformation due to the arc force, resulting in an increase in the amount of spatters. Comparative Example No. 85 has the Ti+Al+Zr content in the wire above the upper limit, so that the droplet became too high in viscosity, resulting in deviation from one pulse-one droplet transfer and an increase in the amount of spatters. In addition, Comparative Example Nos. 76 to 85 satisfy the requirements defined in an aspect of the invention.

The following now explains an example for the control of parameters to maintain the arc length at a given level, in the case that the distance between a chip and a base metal has varied. Table 9 below shows convergence conditions in the case that the distance between a chip and a base metal has varied from the standard condition (the chip-to-base metal distance=25 mm), provided that a wire of 1.2 mm in diameter (JIS Z3312YGW11) was used and welded at a wire feed rate of 10.5 m/minute. Likewise, Table 10 below shows convergence conditions in the case that the distance between a chip and a base metal has varied from the standard condition (the chip-to-base metal distance=25 mm), provided that a wire of 1.2 mm in diameter (JIS Z3312YGW11) was used and welded at a wire feed rate of 16.0 m/minute. In both cases, carbon dioxide alone was used as a shield gas, SM490A was used as a test sheet, and the welding process was carried out at a rate of 40 cm/minute.

TABLE 9

| | Chip-to-base metal-distance (mm) | $I_p1$ | $T_p1$ | $T_{down}$ | $I_b2$ | $T_b1$ | $I_p2$ | $T_p2$ | $T_b2$ |
|---|---|---|---|---|---|---|---|---|---|
| Standard conditions | 25 | 460 | 2.4 | 3 | 160 | 1.5 | 360 | 4 | 14.5 |
| Example 91 | 20 | 460 | 2.4 | 3 | 160 | 1.5 | 360 | 4 | 9.8 |

TABLE 9-continued

|  |  | Chip-to-base metal-distance (mm) | $I_p1$ | $T_p1$ | $T_{down}$ | $I_b2$ | $T_b1$ | $I_p2$ | $T_p2$ | $T_b2$ |
|---|---|---|---|---|---|---|---|---|---|---|
|  | 92 | 20 | 460 | 2.4 | 3 | 160 | 1.5 | 410 | 4 | 12 |
|  | 93 | 20 | 460 | 2.4 | 3 | 165 | 1.5 | 360 | 7 | 12.5 |
|  | 94 | 20 | 460 | 2.4 | 3 | 160 | 1.5 | 400 | 6.3 | 13.4 |
|  | 95 | 30 | 460 | 2.4 | 3 | 160 | 1.5 | 360 | 4 | 19.5 |
|  | 96 | 30 | 460 | 2.4 | 3 | 150 | 1.5 | 320 | 4 | 16 |
|  | 97 | 30 | 460 | 2.4 | 3 | 150 | 1.5 | 360 | 3 | 16.5 |
|  | 98 | 30 | 460 | 2.4 | 3 | 150 | 1.5 | 340 | 3.2 | 15.8 |
| Comparative | 99 | 30 | 460 | 2.4 | 3 | 160 | 1.5 | 360 | 4 | 20.5 |
| Example | 100 | 30 | 460 | 2.4 | 3 | 160 | 1.5 | 360 | 0.6 | 14.5 |
|  | 101 | 30 | 460 | 2.4 | 3 | 160 | 1.5 | 190 | 10 | 7 |
|  |  |  |  |  |  |  |  |  |  | 15 |

TABLE 10

|  |  | Chip-to-base metal distance (mm) | $I_p1$ | $T_p1$ | $T_{down}$ | $I_b2$ | $T_b1$ | $I_p2$ | $T_p2$ | $T_b2$ |
|---|---|---|---|---|---|---|---|---|---|---|
| Standard conditions |  | 25 | 530 | 1.9 | 3 | 160 | 1.5 | 420 | 5 | 5.7 |
| Example | 102 | 20 | 530 | 1.9 | 3 | 170 | 1.5 | 440 | 5 | 3.7 |
|  | 103 | 20 | 530 | 1.9 | 3 | 175 | 1.5 | 420 | 7.2 | 3.9 |
|  | 104 | 20 | 530 | 1.9 | 3 | 170 | 1.5 | 440 | 6.5 | 4.5 |
|  | 105 | 20 | 530 | 1.9 | 3 | 150 | 1.5 | 400 | 5 | 1.5 |
|  | 106 | 20 | 530 | 1.9 | 3 | 140 | 1.5 | 420 | 4 | 7 |
|  | 107 | 20 | 530 | 1.9 | 3 | 150 | 1.5 | 4000 | 4.3 | 6.9 |
| Comparative | 108 | 20 | 530 | 1.9 | 3 | 160 | 1.5 | 420 | 5 | 2.8 |
| Example | 109 | 20 | 530 | 1.9 | 3 | 160 | 1.5 | 430 | 17 | 5.7 |
|  | 110 | 20 | 530 | 1.9 | 3 | 160 | 1.5 | 610 | 3 | 6 |
|  | 111 | 20 | 530 | 1.9 | 3 | 250 | 1.5 | 420 | 5 | 5.7 |

In Example Nos. 91 to 98, and 102 to 107, at least one of $I_p2$, $I_b2$, $T_p2$, and $T_b2$ was adjusted within a range in which one pulse-one droplet transfer is not disturbed even if the distance between a chip and a base metal may vary. As a result, the melting balance was maintained and the arc length was controlled at a given level. In Comparative Example Nos. 99 to 101, and 108 to 111, $I_p2$, $I_b2$, $T_p2$, and $T_b2$ were adjusted correspondingly to a change in the distance between a chip and a base metal, to thereby the melting balance. However, because each parameter deviated from the scope of the invention, one pulse-one droplet transfer was not achieved and there was an increase in the amount of spatters and fumes being generated.

What is claimed is:

1. A pulsed arc welding method comprising the steps of:
   introducing carbon dioxide gas alone or a mixed gas made mainly of carbon dioxide gas as a shield gas;
   applying a pulse current of a series of alternately repeating first and second pulses as a weld current, wherein each of the first pulse and the second pulse has a pulse waveform of a different pulse peak current level and a different pulse width than the other of the first pulse and the second pulse, respectively; and
   controlling the pulse current to maintain the following current conditions:
   peak current ($I_p1$) of the first pulse=300 to 700 A;
   peak period ($T_p1$) of the first pulse=0.3 to 5.0 ms;
   base current ($I_b1$) of the first pulse=30 to 200 A;
   base period ($T_b1$) of the first pulse=0.3 to 10 ms;
   peak current ($I_p2$) of the second pulse=200 to 600 A;
   peak period ($T_p2$) of the second pulse=1.0 to 15 ms;
   base current ($I_b2$) of the second pulse=30 to 200 A; and
   base period ($T_b2$) of the second pulse=3.0 to 20 ms,
   wherein when $I_p1 > I_p2$, $T_b1$ is between $T_p1$ and $T_p2$, one pulse-one droplet transfer is maintained, and a distance between a contact chip and a base metal is varied, at least one of the parameters selected from a group consisting of $I_p2$, $I_b2$, $T_p2$, and $T_b2$ is adjusted so as to control an arc length at a given level, within a range that one pulse-one droplet transfer is not violated,
   whereby spatter generation is reduced.

2. The method according to claim 1, wherein $I_p2$, $T_p2$, and $I_b2$ are preset by wire feed rates, and at least one of the parameters selected from a group consisting of $I_p2$, $T_p2$, and $I_b2$ is adjusted so as to ensure that $T_b2$ falls within a range of 3.0 to 20 ms according to an increase of the wire feed rate.

3. The method according to claim 1, wherein
   a slope is formed about a time axis in order to make a smooth variation with respect to a rise and fall of the first pulse;
   a slope is formed about a time axis in order to make a smooth variation with respect to a rise of the second pulse; and
   $T_{up}1$ and $T_{up}2$ are not longer than 3 ms, and $T_{down}$ not longer than 6 ms,
   in which $T_{up}1$ denotes an upward slope period of the first pulse, $T_{down}$ denotes a downward slope period of the first pulse, and $T_{up}2$ denotes an upward slope period of the second pulse.

4. The method according to claim 1, including a step of detecting a release of a droplet during the first pulse peak period ($T_p1$) or during a subsequent first pulse downward slope period ($T_{down}$) and,
   at the same time, a welding current is immediately changed to a predetermined current level lower than the first pulse base current ($I_b1$) or lower than the current during the detection step.

5. The method according to claim 1, wherein a high frequency pulse of a pulse frequency in a range of 500 to 2000 Hz is superposed on a welding current in one of the periods or in at least two periods among ($T_{up}1$, $T_p1$, $T_{down}$, and $T_b1$), or ($T_{up}2$, $T_p2$, and $T_b2$).

6. The method according to claim 1 utilizing a consumable electrode wire which contains not more than 0.1 wt % of C, 0.20 to 1.0 wt % of Si, 0.5 to 2.0 wt % of Mn, and 0.05 to 0.40 wt % in total of Ti+Al+Zr, with the balance being Fe and inevitable impurities.

7. The method according to claim 6, wherein the consumable electrode wire is not plated with copper on the wire surface.

* * * * *